United States Patent
Itoh et al.

(10) Patent No.: US 11,217,825 B2
(45) Date of Patent: Jan. 4, 2022

(54) ALL SOLID-STATE BATTERY, RESIN APPLICATOR, AND METHOD FOR PRODUCING ALL SOLID-STATE BATTERY

(71) Applicant: TOYOTA JIDOSHA KABUSHIKI KAISHA, Toyota (JP)

(72) Inventors: Yuichi Itoh, Nisshin (JP); Yuto Narita, Miyoshi (JP); Kazuhito Kato, Sunto-gun (JP); Hiroshi Fujiwara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 16/438,793

(22) Filed: Jun. 12, 2019

(65) Prior Publication Data

US 2019/0393557 A1 Dec. 26, 2019

(30) Foreign Application Priority Data

Jun. 26, 2018 (JP) .............................. JP2018-121026
Dec. 5, 2018 (JP) .............................. JP2018-228424

(51) Int. Cl.
- *H01M 4/62* (2006.01)
- *H01M 4/66* (2006.01)
- *H01M 10/0585* (2010.01)
- *B05C 11/00* (2006.01)
- *B05C 5/00* (2006.01)

(52) U.S. Cl.
CPC ......... *H01M 10/0585* (2013.01); *B05C 5/004* (2013.01); *B05C 11/00* (2013.01); *H01M 4/628* (2013.01); *H01M 4/668* (2013.01)

(58) Field of Classification Search
CPC .. H01M 10/0585; H01M 4/668; H01M 4/628; H01M 2/08; H01M 10/0525; H01M 10/0562; Y02E 60/10
See application file for complete search history.

(56) References Cited

U.S. PATENT DOCUMENTS

| | | | | |
|---|---|---|---|---|
| 2007/0105014 A1* | 5/2007 | Shin | ................... | H01M 10/0583 429/152 |
| 2015/0349375 A1* | 12/2015 | Takahashi | ........... | H01M 2/0277 429/7 |
| 2017/0214032 A1* | 7/2017 | Mano | ...................... | H01M 6/02 |
| 2018/0342710 A1* | 11/2018 | Yoon | ................. | H01M 10/0463 |

FOREIGN PATENT DOCUMENTS

| | | |
|---|---|---|
| JP | 2014-089842 A | 5/2014 |
| JP | 2015-162353 A | 9/2015 |

* cited by examiner

*Primary Examiner* — Lisa S Park
(74) *Attorney, Agent, or Firm* — Oliff PLC

(57) ABSTRACT

A solid-state battery includes a third active material layer, a first solid electrolyte layer, a first active material layer, a first current collector layer, a second active material layer, a second solid electrolyte layer and a fourth active material layer in the order mentioned, wherein both the first and second active layers are anode or cathode active material layers. When both the first and second active layers are anode layers, both the third and fourth active layers are cathode layers. When both the first and second active layers are cathode layers, both the third and fourth active layers are anode layers, at least the first current collector layer extends to an outer side than the third and fourth active layers, and an insulating resin layer continuously across a surface of the extending part on one side, a side face and a surface of the extending part on the other side.

7 Claims, 13 Drawing Sheets

Art of present disclosure

ALL SOLID-STATE BATTERY, RESIN APPLICATOR, AND METHOD FOR PRODUCING ALL SOLID-STATE BATTERY

FIELD

The present application discloses an all solid-state battery etc.

BACKGROUND

Patent Literature 1 discloses the art of arranging an insulating resin so as to put the resin in a cavity portion in an end part of an all-solid state battery that includes an anode and a cathode, the anode being larger than the cathode in area, in order to prevent the end part of the battery from getting damaged, and to insulate the end part. In addition, Patent Literature 2 discloses the art of surrounding a battery element of an all solid-state battery by a sealing layer.

CITATION LIST

Patent Literature

Patent Literature 1: JP 2015-162353 A
Patent Literature 2: JP 2014-089842 A

SUMMARY

Technical Problem

Patent Literature 1 does not disclose any specific means for arranging the insulating resin in the cavity portion in the end part of the battery. For example, it is considered that the resin is applied to the cavity portion in the end part of the battery using a dispenser or the like in view of well-known arts. In this case, a nozzle has to be brought to be closer to an electrode. However, there is a risk that the nozzle comes into contact with the electrode to damage the electrode since there exist camber and waviness in the all solid-state battery due to compact pressing. Alternatively, it is considered that the resin is applied to the cavity portion in the end part of the battery using a spray or the like. However, in this case, it is difficult to precisely apply the resin to the inside of the cavity at the end part of the electrode to suitably insulate the end part. Alternatively, it is considered that a battery case is filled with a thermosetting resin after the all solid-state battery is stored in the battery case, to arrange the resin on the end part of the all solid-state battery as disclosed in Patent Literature 2. In this case, it is difficult to precisely arrange the resin inside the cavity at the end part of the electrode as well.

An active material layer etc. are exposed at the end part of the all solid-state battery disclosed in Patent Literature 1, which may incur risks of short circuits and sliding down at the end part of the battery (see FIG. 4A). In some cases, a cathode current collector tab that is connected to a cathode current collector layer and/or an anode current collector tab that is connected to an anode current collector layer is/are protruded from a side face of an all solid-state battery. For example, when a cathode current collector tab is protruded from a cathode current collector layer in the all solid-state battery disclosed in Patent Literature 1, there is a risk that the cathode current collector tab comes into contact with an anode active material layer, a solid electrolyte layer or an anode current collector layer to lead to short circuits and sliding down at the end part of the battery.

Solution to Problem

The present application discloses, as one means for solving the problems, an all solid-state battery comprising: a first current collector layer; a first active material layer that is layered onto a surface of the first current collector layer on one side; a second active material layer that is layered onto a surface of the first current collector layer on another side; a first solid electrolyte layer that is layered onto a surface of the first active material layer on the one side; a second solid electrolyte layer that is layered onto a surface of the second active material layer on the other side; a third active material layer that is layered onto a surface of the first solid electrolyte layer on the one side; a fourth active material layer that is layered onto a surface of the second solid electrolyte layer on the other side; a second current collector layer that is layered onto a surface of the third active material layer on the one side; and a third current collector layer that is layered onto a surface of the fourth active material layer on the other side, wherein both the first and second active material layers are anode active material layers or cathode active material layers, and in a case where both the first and second active material layers are anode active material layers, both the third and fourth active material layers are cathode active material layers and in a case where both the first and second active material layers are cathode active material layers, both the third and fourth active material layers are anode active material layers, at least the first current collector layer extends to an outer side than the third and fourth active material layers, to constitute an extending part, and an insulating resin layer is continuously provided across a surface of the extending part on the one side, a side face of the extending part, and a surface of the extending part on the other side.

In the all solid-state battery of the present disclosure, a surface of the insulating resin layer on the one side may be present closer to the other side than the surface of the third active material layer on the one side is, and a surface of the insulating resin layer on the other side may be present closer to the one side than the surface of the fourth active material layer on the other side is.

In the all solid-state battery of the present disclosure, the insulating resin layer may be present only between the second and third current collector layers.

In the all solid-state battery of the present disclosure, at least the first current collector layer, the first active material layer and the second active material layer may extend to an outer side than the third and fourth active material layers, to constitute the extending part.

In the all solid-state battery of the present disclosure, the first current collector layer, the first active material layer, the second active material layer, the first solid electrolyte layer and the second solid electrolyte layer may extend to an outer side than the third and fourth active material layers, to constitute the extending part.

In the all solid-state battery of the present disclosure, the insulating resin layer may be continuously provided across the surface of the first solid electrolyte layer on the one side, the side face of the extending part, and the surface of the second solid electrolyte layer on the other side.

The present application discloses, as one means for solving the problems, a resin applicator comprising: a pair of transfer rings that are arranged so that transfer surfaces face each other via a clearance; at least one resin supply that supplies an ultraviolet cure resin to the transfer surfaces of the transfer rings; and at least one ultraviolet light source that supplies an ultraviolet ray to at least the clearance, the resin applicator being configured so that: an end part of a body to be transferred is arranged in the clearance; the ultraviolet cure resin that is supplied from the resin supply to the transfer surfaces of the transfer rings is transferred from the transfer surfaces across a surface of the end part of the body to be transferred on one side, a side face of the end part thereof, and a surface of the end part thereof on another side at the same time as the transfer rings rotate; and the ultraviolet cure resin, which is transferred, is cured by the ultraviolet ray from the ultraviolet light source, to continuously provide an insulating resin layer across the surface of the end part of the body to be transferred on the one side, the side face of the end part thereof, and the surface of the end part thereof on the other side.

In the resin applicator of the present disclosure, the transfer rings may be transparent to an ultraviolet ray, and the resin applicator may be configured so that ultraviolet ray emitted from the ultraviolet light source is transmitted through the transfer rings to reach the clearance.

The resin applicator of the present disclosure may further comprise: reflectors inside the transfer surfaces respectively, the reflectors reflecting the ultraviolet ray from the ultraviolet light source, may be configured so that the ultraviolet ray emitted from the ultraviolet light source is reflected by the reflectors, and is transmitted through the transfer rings to reach the clearance.

In the resin applicator of the present disclosure, the reflectors may be continuously provided on concentric circles of the transfer rings inside the transfer surfaces respectively.

The resin applicator of the present disclosure may further comprise: a plurality of the ultraviolet light sources, the resin applicator being configured so that: an ultraviolet ray emitted from a part of the ultraviolet light sources is transmitted through the transfer rings, to reach portions of the transfer surfaces, the portions not facing the clearance, and the ultraviolet cure resin that is supplied from the resin supply to the transfer surfaces is precured by the ultraviolet ray from the part of the ultraviolet light sources on the transfer surfaces before the ultraviolet ray reaches the clearance.

In the resin applicator of the present disclosure, a wavelength of the ultraviolet ray emitted from the part of the ultraviolet light sources may be different from a wavelength of an ultraviolet ray emitted from the rest of the ultraviolet light sources.

In the resin applicator of the present disclosure, the ultraviolet cure resin may be material that is cured by being irradiated with ultraviolet light having at least 2 wavelengths.

In the resin applicator of the present disclosure, the transfer surfaces may be made from polytetrafluoroethylene or silicon.

In the resin applicator of the present disclosure, the ultraviolet cure resin may contain filler.

The resin applicator of the present disclosure may further comprise: at least one roller on a downstream side of the transfer rings, the roller assisting the body to be transferred in release from the transfer surfaces.

The resin applicator of the present disclosure may further comprise: a spacing mechanism for increasing and reducing the clearance.

In the resin applicator of the present disclosure, a notch may be provided for at least one of the transfer rings.

In the resin applicator of the present disclosure, the transfer rings may have conveyor belts respectively on surfaces thereof, surfaces of the conveyor belts may be the transfer surfaces, and material of the surfaces of the conveyor belts may be superior in releasability from the ultraviolet cure resin to material of a surface of the end part.

The present application discloses, as one means for solving the problems, a method for producing an all solid-state battery, the method comprising: layering a first active material layer onto a surface of a first current collector layer on one side; layering a second active material layer onto a surface of the first current collector layer on another side; layering a first solid electrolyte layer onto a surface of the first active material layer on the one side; layering a second solid electrolyte layer onto a surface of the second active material layer on the other side; layering a third active material layer onto a surface of the first solid electrolyte layer on the one side; layering a fourth active material layer onto a surface of the second solid electrolyte layer on the other side; making both the first and second active material layers anode active material layers or cathode active material layers, and in a case where both the first and second active material layers are anode active material layers, making both the third and fourth active material layers cathode active material layers and in a case where both the first and second active material layers are cathode active material layers, making both the third and fourth active material layers anode active material layers; extending at least the first and second active material layers to an outer side than the third and fourth active material layers, to constitute an extending part; continuously providing ultraviolet cure resin across a surface of the extending part on the one side, a side face of the extending part, and a surface of the extending part on the other side by transfer; irradiating the ultraviolet cure resin, which is transferred to the extending part, with an ultraviolet ray, and curing the ultraviolet cure resin to form an insulating resin layer; and layering a second current collector layer onto a surface of the third active material layer on the one side and layering a third current collector layer onto a surface of the fourth active material layer on the other side after providing the insulating resin layer for the extending part.

Advantageous Effects

The all solid-state battery of this disclosure makes it possible to suppress short circuits and sliding down at an end part of the battery.

The resin applicator of the present disclosure transfers resin to one and other faces and a side face of an end part of a body to be transferred at the same time using a pair of transfer rings, which makes it possible to provide a precise amount of an insulating resin layer for an exact portion of the end part of the body to be transferred while avoiding damage to the end part of the body to be transferred.

According to the method for producing an all solid-state battery of the present disclosure, resin is transferred to surfaces of an extending part of the all solid-state battery on one and other sides and a side face thereof at the same time, which makes it possible to provide a precise amount of an insulating resin layer for an exact portion of the extending part while avoiding damage to the extending part. In addition, second and third current collector layers are provided after the insulating resin layer is provided for the extending part, which makes it possible to suppress short circuits and sliding down at an end part of the battery.

DETAILED DESCRIPTION OF EMBODIMENTS

1. All Solid-State Battery 100

Figure 1:
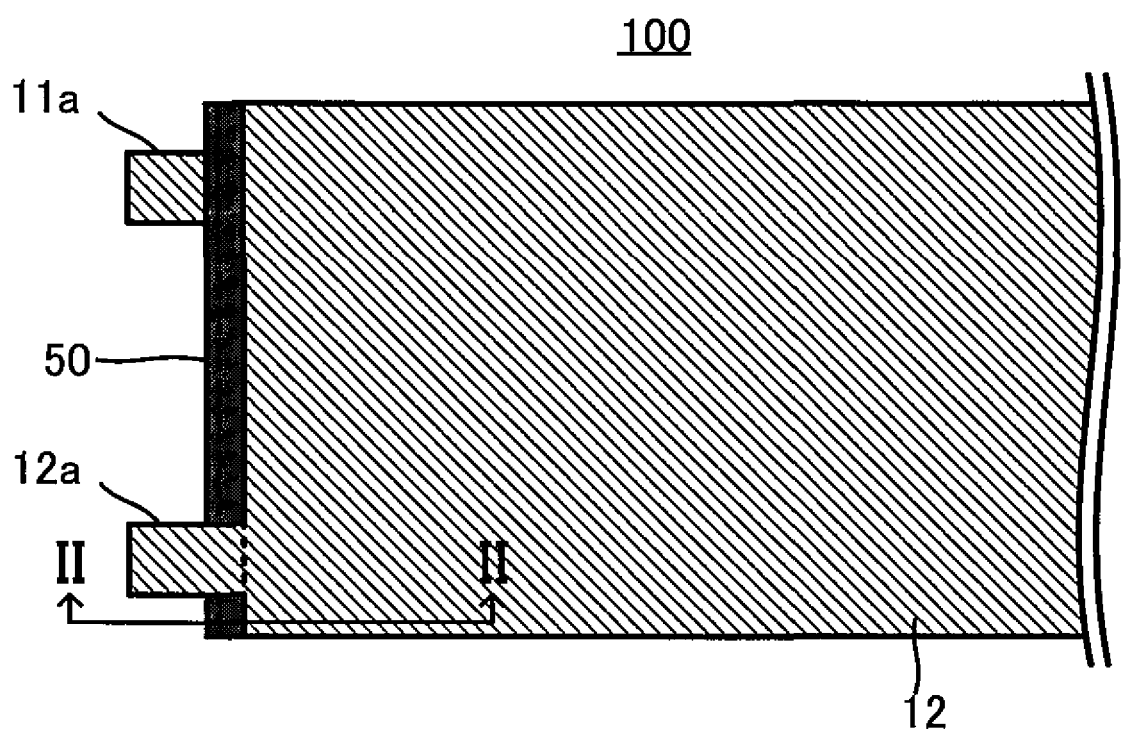
FIG. 1 is a schematic view of part of an all solid-state battery 100.
Figure 2A:
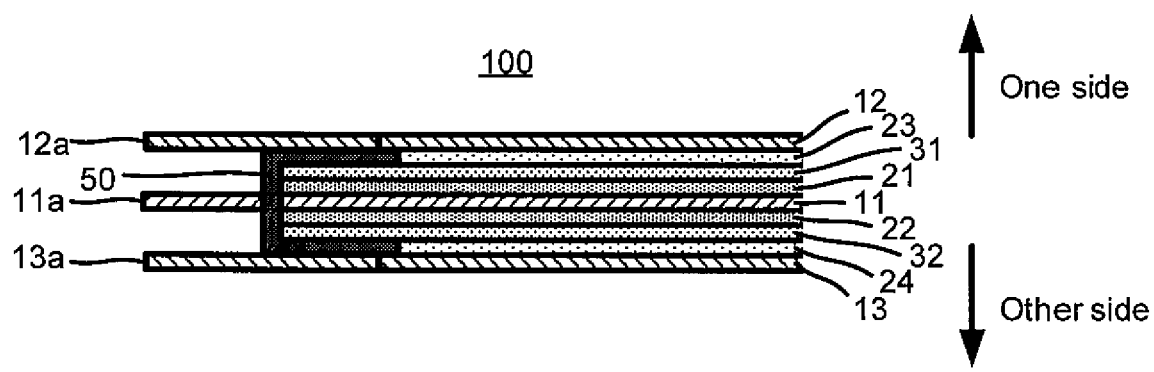
FIGS. 2A and 2B are schematic views of structure of a cross section taken along the line II-II of FIG. 1: the structure is partially shown by thin dotted lines in FIG. 2B for illustrating an extending part 40.
Figure 2B:
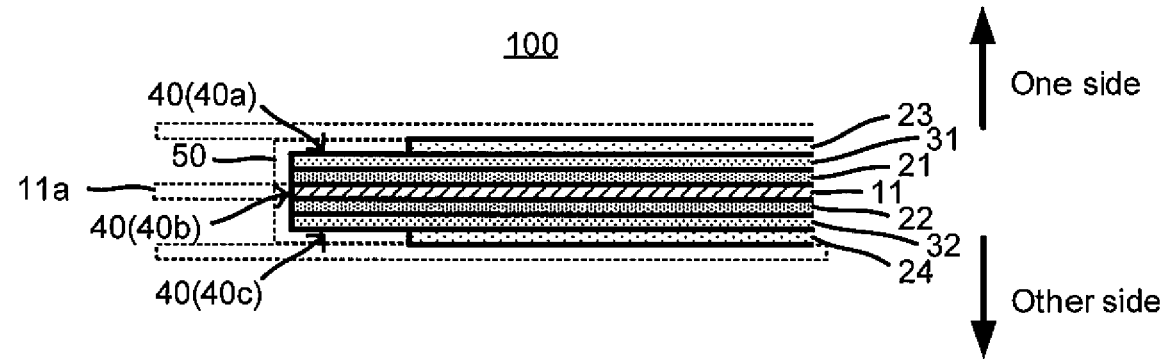

FIGS. 1 to 2B schematically show structure of an all solid-state battery 100. FIG. 1 schematically shows part of the all solid-state battery 100. In FIG. 1, layers are layered in the direction into and out of the page. FIGS. 2A and 2B schematically show structure of a cross section taken along the line II-II of FIG. 1. In FIG. 2B, the structure is partially shown by thin dotted lines for illustrating an extending part 40.

As shown in FIGS. 1 to 2B, the all solid-state battery 100 comprises: a first current collector layer 11; a first active material layer 21 that is layered onto a surface of the first current collector layer 11 on one side; a second active material layer 22 that is layered onto a surface of the first current collector layer 11 on another side; a first solid electrolyte layer 31 that is layered onto a surface of the first active material layer 21 on the one side; a second solid electrolyte layer 32 that is layered onto a surface of the second active material layer 22 on the other side; a third active material layer 23 that is layered onto a surface of the first solid electrolyte layer 31 on the one side; a fourth active material layer 24 that is layered onto a surface of the second solid electrolyte layer 32 on the other side; a second current collector layer 12 that is layered onto a surface of the third active material layer 23 on the one side; and a third current collector layer 13 that is layered onto a surface of the fourth active material layer 24 on the other side. In the all solid-state battery 100, both the first and second active material layers 21 and 22 are anode active material layers or cathode active material layers, and in a case where both the first and second active material layers 21 and 22 are anode active material layers, both the third and fourth active material layers 23 and 24 are cathode active material layers and in a case where both the first and second active material layers 21 and 22 are cathode active material layers, both the third and fourth active material layers 23 and 24 are anode active material layers. As shown in FIGS. 2A and 2B, in the all solid-state battery 100, at least the first current collector layer 11 extends to an outer side than the third and fourth active material layers 23 and 24, to constitute the extending part 40. As shown in FIGS. 2A and 2B, in the all solid-state battery 100, an insulating resin layer 50 is continuously provided across a surface 40a of the extending part 40 on the one side, a side face 40b of the extending part, and a surface 40c of the extending part on the other side.

1.1. First Current Collector Layer

The first current collector layer 11 may be composed of metal foil, a metal mesh, etc., and is especially preferably composed of metal foil. Examples of metal constituting the first current collector layer 11 include Cu, Ni, Cr, Au, Pt, Ag, Al, Fe, Ti, Zn, Co and stainless steel. Cu is especially preferable. The first current collector layer 11 may have some coating layer over its surface for adjusting resistance. The first current collector layer 11 may be composed of a plurality of layers. For example, the first current collector layer 11 can be composed by layering a plurality of sheets of metal foil. The thickness of the first current collector layer 11 (total thickness if the first current collector layer 11 is composed of a plurality of layers. The same will be applied to the other layers) is not specifically limited, and for example, is preferably 0.1 μm to 1 mm, and is more preferably 1 μm to 100 μm. When the first active material layer 21 and the second active material layer 22, which will be described later, are anode active material layers, the first current collector layer 11 functions as an anode current collector layer. On the other hand, when the first active material layer 21 and the second active material layer 22 are cathode active material layers, the first current collector layer 11 functions as a cathode current collector layer.

1.2. First and Second Active Material Layers

In the all solid-state battery 100, the first active material layer 21 is layered onto the surface of the first current collector layer 11 on the one side, and the second active material layer 22 is layered onto the first current collector layer 11 on the other side. The first active material layer 21 may be composed of a plurality of layers. For example, the first active material layer 21 can be composed as the whole of a plurality of layers by laminating a surface of one active material layer with a further active material layer. The second active material layer 22 may be composed of a plurality of layers as well. Both the first active material layer 21 and the second active material layer 22 are anode active material layers or cathode active material layers, and especially preferably anode active material layers. The first active material layer 21 and the second active material layer 22 may be layers containing either the same material or different materials, and are preferably layers containing the same material. Hereinafter an anode active material layer will be described.

The anode active material layer is a layer containing at least an active material. The anode active material layer may optionally contain a solid electrolyte, binder, a conductive additive, etc. in addition to an active material. A known active material may be used. One may select two materials different in electric potential at which a predetermined ion is stored/released (charge/discharge potential) among known active materials, to use a material displaying a noble potential as a cathode active material described later, and a material displaying a base potential as an anode active material. When a lithium ion battery is made, examples of the anode active material include silicon-based active materials such as Si, Si alloys and silicon oxide; carbon-based active materials such as graphite and hard carbon; various oxide-based active materials such as lithium titanate; and lithium metals and lithium alloys. An inorganic solid electrolyte is preferable as a solid electrolyte that may be contained in the anode active material layer because ion conductivity thereof is high compared with an organic polymer electrolyte. This is also because an inorganic solid electrolyte has a good heat resistance compared with an organic polymer electrolyte. Preferred examples of an inorganic solid electrolyte include oxide solid electrolytes such as lithium lanthanum zirconate, LiPON, $Li_{1+X}Al_XGe_{2-X}(PO_4)_3$, Li—SiO based glass and Li—Al—S—O based glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$ and $Li_2S$—$P_2S_5$—$GeS_2$. Especially, sulfide solid electrolytes are preferable, sulfide solid electrolytes containing $Li_2S$—$P_2S_5$ are more preferable, and sulfide solid electrolytes containing $Li_2S$—$P_2S_5$—LiI—LiBr are further preferable. Examples of binder that may be contained in the anode active material layer include butadiene rubber (BR), butyl rubber (IIR), acrylate-butadiene rubber (ABR) and polyvinylidene difluoride (PVdF). Examples of conductive additive that may be contained in the anode active material layer include carbon materials such as acetylene black and Ketjenblack, and metallic materials such as nickel, aluminum and stainless steel. The contents of the constituents in the anode active material layer may be the same as in a conventional one. The shape of the anode active material layer may be the same as a conventional one as well. Specifically, from the viewpoint that the all solid-state battery 100 can be easily composed, the anode active material layer in the form of a sheet is preferable. In this case, the thickness of the anode active material is, for example, preferably 0.1 μm to 1 mm, and more preferably 1 μm to 150 μm. The size (area and thickness) of the anode active material layer is preferably determined so that a capacity of an anode is larger than that of a cathode.

1.3. First and Second Solid Electrolyte Layers

In the all solid-state battery 100, the first solid electrolyte layer 31 is layered onto the surface of the first active material layer 21 on the one side, and the second solid electrolyte layer 32 is layered onto the surface of the second current collector layer 22 on the other side. The first solid electrolyte layer 31 may be composed of a plurality of layers. For example, the first solid electrolyte layer 31 can be composed as the whole of a plurality of layers by laminating a surface of one solid electrolyte layer with a further solid electrolyte layer. The second solid electrolyte layer 32 may be composed of a plurality of layers as well. The first solid electrolyte layer 31 and the second solid electrolyte layer 32 may be layers containing either the same material or different materials, and are preferably layers containing the same material.

The solid electrolyte layers are layers containing at least an electrolyte. Each solid electrolyte layer may optionally contain binder in addition to a solid electrolyte. This solid electrolyte is preferably an inorganic solid electrolyte as described above, and more preferably a sulfide solid electrolyte. In this case, a sulfide solid electrolyte contained in the solid electrolyte layer is preferably a sulfide solid electrolyte containing $Li_2S$—$P_2S_5$, and more preferably a sulfide solid electrolyte containing $Li_2S$—$P_2S_5$—LiI—LiBr. Binder equivalent to that as described above may be properly selected to be used. The contents of the constituents in the solid electrolyte layer may be the same as in a conventional one. The shape of the solid electrolyte layer may be the same as a conventional one as well. Specifically, from the viewpoint that the all solid-state battery 100 can be easily composed, the solid electrolyte layer in the form of a sheet is preferable. In this case, the thickness of the solid electrolyte layer is, for example, preferably 0.1 μm to 1 mm, and more preferably 1 μm to 100 μm.

1.4. Third and Fourth Active Material Layers

In the all solid-state battery 100, the third active material layer 23 is layered onto the surface of the first solid electrolyte layer 31 on the one side, and the fourth active material layer 24 is layered onto the second solid electrolyte layer 32 on the other side. The third active material layer 23 may be composed of a plurality of layers. For example, the third active material layer 23 can be composed as the whole of a plurality of layers by laminating a surface of one active material layer with a further active material layer. The fourth active material layer 24 may be composed of a plurality of layers as well. When the first active material layer 21 and the second active material layer 22 are anode active material layers, the third active material layer 23 and the fourth active material layer 24 are cathode active material layers. On the other hand, when the first active material layer 21 and the second active material layer 22 are cathode active material layers, the third active material layer 23 and the fourth active material layer 24 are anode active material layers. The third active material layer 23 and the fourth active material layer 24 are especially preferably cathode active material layers. The third active material layer 23 and the fourth active material layer 24 may be layers containing either the same material or different materials, and are preferably layers containing the same material. Hereinafter a cathode active material layer will be described.

The cathode active material layer is a layer containing at least an active material. The cathode active material layer may optionally contain a solid electrolyte, binder, a conductive additive, etc. in addition to an active material. A known active material may be used. One may select two materials different in electric potential at which a predetermined ion is stored/released (charge/discharge potential) among known active materials, to use a material displaying a noble potential as a cathode active material, and a material displaying a base potential as the anode active material described above. When a lithium ion battery is composed, examples of the cathode active material include various lithium-containing composite oxides such as lithium cobaltate, lithium nickelate, $LiNi_{1/3}Co_{1/3}Mn_{1/3}O_2$, lithium manganate and spinel lithium compounds. The surface of the cathode active material may be coated with an oxide layer such as a lithium niobate layer, a lithium titanate layer and a lithium phosphate layer. A solid electrolyte that may be contained in the cathode active material layer is preferably an inorganic solid electrolyte as described above. Specifically, a sulfide solid electrolyte is preferable, a sulfide solid electrolyte containing $Li_2S$—$P_2S_5$ is more preferable, and a sulfide solid electrolyte containing $Li_2S$—$P_2S_5$—LiI—LiBr is further preferable. Examples of binder that may be contained in the cathode active material layer include butadiene rubber (BR), butyl rubber (IIR), acrylate-butadiene rubber (ABR) and polyvinylidene difluoride (PVdF). Examples of conductive additive that may be contained in the cathode active material layer include carbon materials such as acetylene black and Ketjenblack, and metallic materials such as nickel, aluminum and stainless steel. The contents of the constituents in the cathode active material layer may be the same as in a conventional one. The shape of the cathode active material layer may be the same as a conventional one as well. Specifically, from the viewpoint that the all solid-state battery 100 can be easily composed, the cathode active material layer in the form of a sheet is preferable. In this case, the thickness of the cathode active material layer is, for example, preferably 0.1 μm to 1 mm, and more preferably 1 μm to 150 μm.

1.5. Second and Third Current Collector Layers

In the all solid-state battery 100, the second current collector layer 12 is layered onto the surface of the third active material layer 23 on the one side, and the third current collector layer 13 is layered onto the surface of the fourth active material layer 24 on the other side. The second current collector layer 12 may be composed of a plurality of layers. For example, the second current collector layer 12 can be composed by layering a plurality of sheets of metal foil. The third current collector layer 13 may be composed of a plurality of layers as well. The second current collector layer 12 and the third current collector layer 13 may be layers containing either the same material or different materials, and are preferably layers containing the same material. In addition, the first current collector layer 11 and the second current collector layer 12 may be layers containing either the same material or different materials, and are preferably layers containing different materials. Further, the first current collector layer 11 and the third current collector layer 13 may be layers containing either the same material or different materials, and are preferably layers containing different materials The second current collector layer 12 and the third current collector layer 13 may be composed of metal foil, a metal mesh, etc., and are especially preferably composed of metal foil. Examples of metal constituting the second current collector layer 12 and the third current collector layer 13 include Cu, Ni, Cr, Au, Pt, Ag, Al, Fe, Ti, Zn, Co and stainless steel, and especially preferred examples include Al. The second current collector layer 12 and the third current collector layer 13 may have some coating layer over their surfaces for adjusting resistance. The thicknesses of the second current collector layer 12 and the third current collector layer 13 are not specifically limited, and for example, are preferably 0.1 μm to 1 mm, and are more preferably 1 μm to 100 μm. When the first active material layer 21 and the second active material layer 22 are anode active material layers, the second current collector layer 12 and the third current collector layer 13 function as cathode current collector layers. On the other hand, when the first active material layer 21 and the second active material layer 22 are cathode active material layers, the second current collector layer 12 and the third current collector layer 13 function as anode current collector layers.

1.6. Extending Part

In the all solid-state battery 100, at least the first current collector layer 11 extends to an outer side than the third and fourth active material layers 23 and 24, to constitute an extending part 40. In other words, viewed in the direction of layering the layers, the area of the first current collector layer 11 is larger than each area of the third active material layer 23 and the fourth active material layer 24. The extending part 40 has only to include at least the first current collector layer 11. Preferably, at least the first current collector layer 11, the first active material layer 21 and the second active material layer 22 extend to an outer side than the third and fourth active material layers 23 and 24, to constitute the extending part 40. More preferably, as shown in FIGS. 2A and 2B, the first current collector layer 11, the first active material layer 21, the second active material layer 22, the first solid electrolyte layer 31 and the second solid electrolyte layer 32 extend to an outer side than the third and fourth active material layers 23 and 24, to constitute the extending part 40. The lengths of extending the first current collector layer 11, the first active material layer 21, the second active material layer 22, the first solid electrolyte layer 31 and the second solid electrolyte layer 32 may be either the same as or different from each other. As shown in FIGS. 2A and 2B, the lengths are preferably almost the same. In the all solid-state battery 100 of the present disclosure, the problem of short circuits and sliding down is solved by covering the extending part 40 with the insulating resin layer 50.

1.7. Insulating Resin Layer

In the all solid-state battery 100, the insulating resin layer 50 is continuously provided across the surface of the extending part 40 on the one side, the side face thereof, and the surface thereof on the other side. As shown in FIGS. 2A and 2B, the insulating resin layer 50 may have almost a C-shaped cross section. The insulating resin layer 50 has only to be made from an insulating resin, and is especially preferably made from an ultraviolet cure resin. An ultraviolet cure resin used here is not specifically limited, and any popular ultraviolet cure resin may be employed. Examples thereof include ultraviolet cure resins of a cationic polymerization system and a radical polymerization system. The insulating resin layer 50 may contain filler in view of improving reliability of the thickness etc. A filler used here is not specifically limited, and a particle made from any material may be employed.

In the all solid-state battery 100, preferably, the first current collector layer 11, the first active material layer 21, the second active material layer 22, the first solid electrolyte layer 31 and the second solid electrolyte layer 32 extend to an outer side than the third and fourth active material layer 23 and 24, to constitute the extending part 40, and the insulating resin layer 50 is continuously provided across the surface of the first solid electrolyte layer 31 on the one side, the side face of the extending part 40, and the surface of the second solid electrolyte layer 42 on the other side. Whereby, the first current collector layer 11 and the first active material layer 21 can be more reliably prevented from coming into contact with the second current collector layer 12, and the first current collector layer 11 and the second active material layer 22 can be more reliably prevented from coming into contact with the third current collector layer 13. That is, short circuits between the cathode and the anode can be further suppressed.

Figure 3:
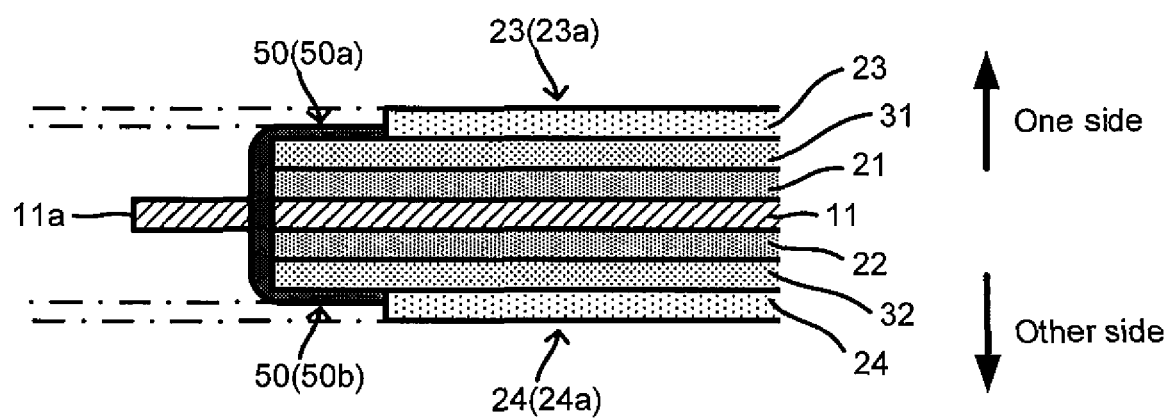
FIG. 3 is a schematic view of an example of the positional relationship between an insulating resin layer 50 and a third active material layer 23, and the positional relationship between the insulating resin layer 50 and a fourth active material layer 24.

The thickness of the insulating resin layer 50 is not specifically limited, and may be properly determined in view of the balance of the volumetric energy density and the insulating function of the battery etc. For example, the insulating resin layer 50 over the surface of the extending part 40 on the one side (thickness in the direction of layering the layers 11, 21 . . . ) is preferably thinner than the third active material layer 23, and the insulating resin layer 50 over the surface of the extending part 40 on the other side (thickness in the direction of layering the layers 11, 21 . . . ) is preferably thinner than the fourth active material layer 24. As shown by the dashed dotted lines in FIG. 3, preferably, a surface 50*a* of the insulating resin layer 50 on the one side is present closer to the other side than a surface 23*a* that is a surface of the third active material layer 23 on the one side is, and a surface 50*b* of the insulating resin layer 50 on the other side is present closer to the one side than a surface 24*a* that is a surface of the fourth active material layer 24 on the other side is. The insulating resin layer 50 over the side face of the extending part 40 (thickness in the direction of extending the extending part 40) may be thick. The insulating resin layer 50 may abut the side face of the third active material layer 23 and/or the side face of the fourth active material layer 24, and there may be (a) gap(s) between the insulating resin layer 50 and the side face of the third active material layer 23 and/or the side face of the fourth active material layer 24. The insulating resin layer 50 may reach the surface of the third active material layer 23 on the one side and/or the surface of the fourth active material layer 24 on the other side.

As shown in FIGS. 2A and 2B, in the all solid-state battery 100 of the present disclosure, the side face of an end part of the second current collector layer 12 and the surface of the second current collector layer 12 on the one side (the faces closer to the one side than the surface of the second current collector layer 12 on the other side) and the side face of an end part of the third current collector layer 13 and the surface of the third current collector layer 13 on the other side (the faces closer to the other side than the surface of the third current collector layer 13 on the one side) are not necessarily covered with the insulating resin layer 50. That is, as shown in FIGS. 2A and 2B, the insulating resin layer 50 has only to be present between the second current collector layer 12 and the third current collector layer 13. As described above, covering only the extending part 40 with the insulating resin layer 50 brings about a sufficient effect in the all solid-state battery 100, which makes it possible to suppress short circuits and sliding down at the end part of the battery without covering all the end part of the battery with an insulating resin.

1.8. Other Components

The all solid-state battery may include a current collector tab that is connected to a current collector layer, and this current collector tab may protrude from a side face. Specifically, as shown in FIGS. 1 to 2B, the all solid-state battery 100 may include a first current collector tab 11*a* that is connected to the first current collector layer 11, a second current collector tab 12*a* that is connected to the second current collector layer 12, and a third current collector tab 13*a* that is connected to the third current collector layer 13. The current collector tabs 11*a* to 13*a* may protrude from the side face of the battery. The current collector tabs and the current collector layers may be made from either the same material or different materials. The lengths of protruding the current collector tabs are not specifically limited.

The all solid-state battery 100 may be stored in a battery case such as a laminate pack. A plurality of the all solid-state batteries 100, 100 . . . may be combined to compose one stacked battery. For example, one may stack a plurality of the all solid-state batteries 100, electrically connect the cathodes of the all solid-state batteries 100, 100 . . . to each other in parallel and electrically connect the anodes thereof to each other in parallel to compose one stacked battery, and thereafter store the stacked battery in a battery case.

1.9. Effect

Figure 4A:
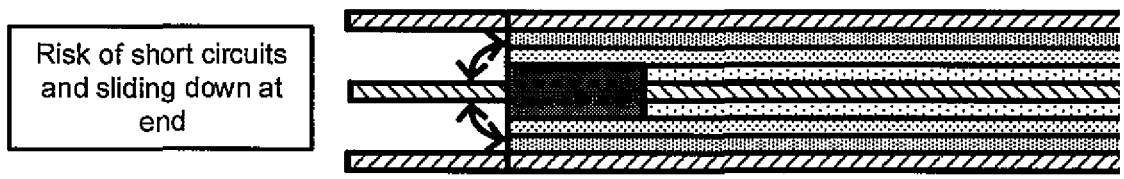
FIGS. 4A and 4B are schematic views illustrating effect of the all solid-state battery 100 compared with a conventional art.
Figure 4B:
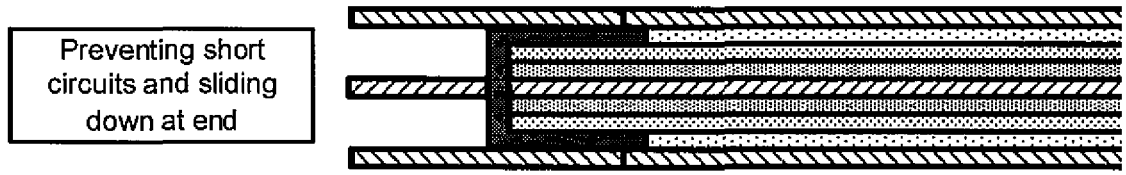

As shown in FIG. 4A, in a conventional art (Patent Literature 1 etc.), an active material layer etc. are exposed at an end part of a battery, which incurs risks of short circuits and sliding down of materials at the end part of the battery due to contact between a current collector layer or current collector tab and an active material layer or the like. In contrast, as shown in FIG. 4B, according to the art of the present disclosure, providing the insulating resin layer for the extending part prevents a current collector layer or current collector tab from coming into contact with an active material layer or the like, which makes it possible to suppress short circuits and sliding down of materials at the end part of the battery.

2. Resin Applicator 2.1. Resin Applicator 200

Figure 5:
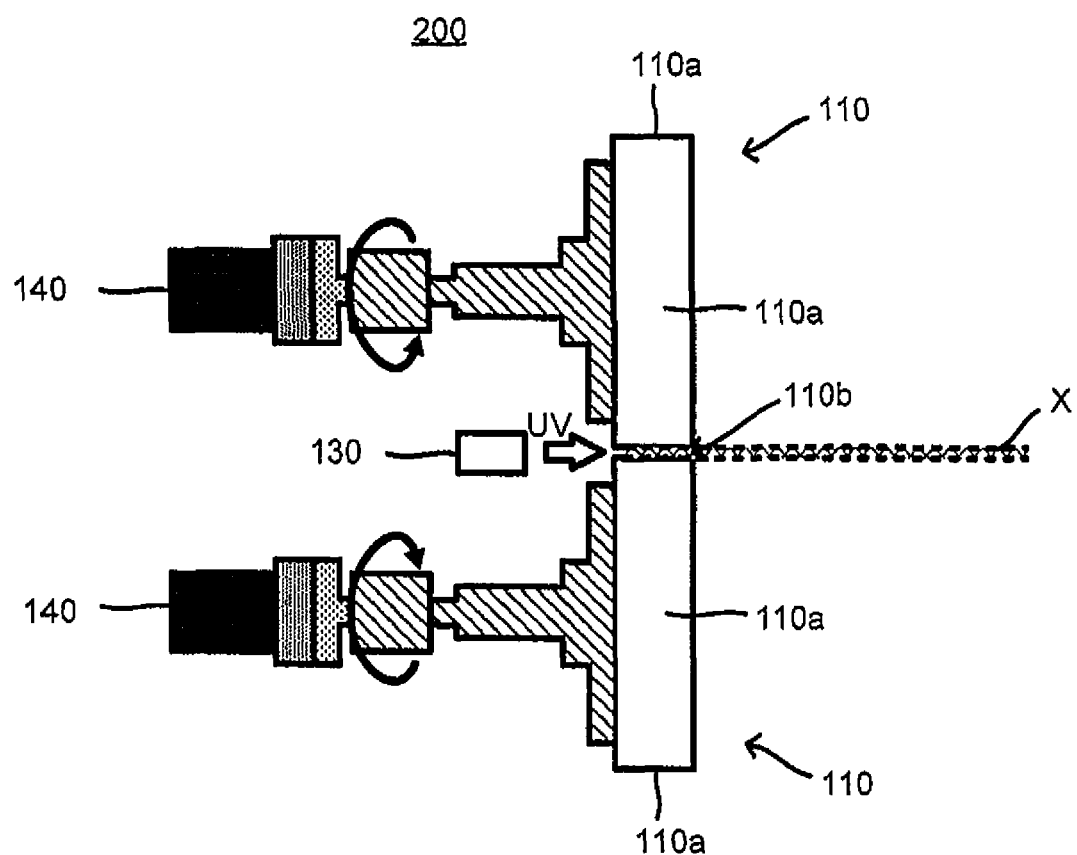
FIG. 5 is a schematic view of structure of a resin applicator 200: a body to be transferred X is conveyed into the page.
Figure 6:
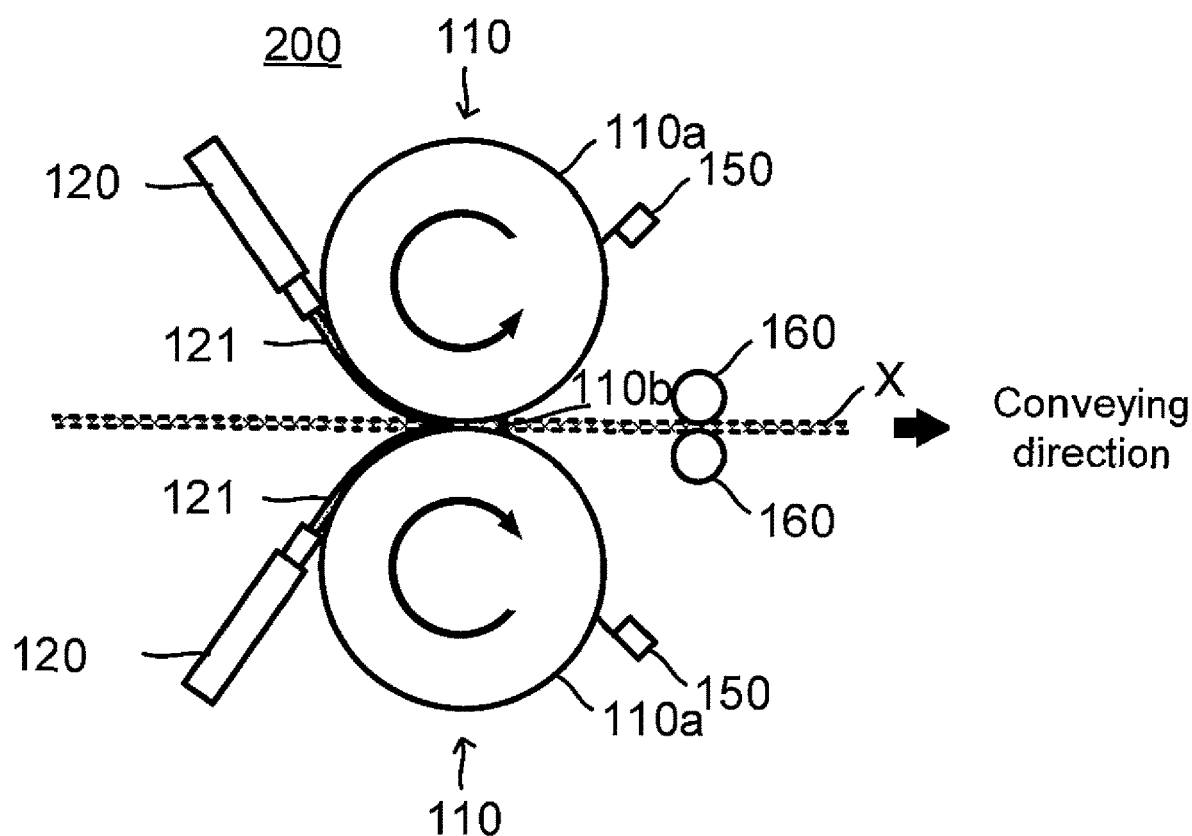
FIG. 6 is a schematic view of structure of the resin applicator 200: the body to be transferred X is conveyed across the page from left to right.

FIGS. 5 and 6 schematically show structure of a resin applicator 200. As shown in FIGS. 5 and 6, the resin applicator 200 includes a pair of transfer rings 110, 110 that are arranged so that transfer surfaces 110*a*, 110*a* face each other via a clearance 110*b*; at least one resin supply (supplies) 120, 120 that supplies an ultraviolet cure resin 121 to the transfer surfaces 110*a*, 110*a* of the transfer rings 110, 110; and at least one ultraviolet light source 130 that supplies an ultraviolet ray to at least the clearance 110*b*. The insulating resin layer can be easily and properly provided across a surface of an end part of a body to be transferred X (such as the extending part 40 of the all solid-state battery 100) on one side, a side face of the end part thereof, and a surface of the end part thereof on the other side by structuring those transfer rings 110, resin supply 120 and ultraviolet light source 130 in the resin applicator 200 as follows, for example. That is, for example, the resin applicator 200 is configured so that: the end part of the body to be transferred X is arranged in the clearance 110*b*; the ultraviolet cure resin 121 that is supplied from the resin supply 120 to the transfer surfaces 110*a*, 110*a* of the transfer rings 110, 110 is transferred from the transfer surfaces 110*a*, 110*a* across a surface of the end part of the body to be transferred X on the one side, the side face of the end part thereof, and the surface of the end part thereof on the other side at the same time as the transfer rings 110, 110 rotate; and the transferred ultraviolet cure resin 121 is cured by the ultraviolet ray from the ultraviolet light source 130, to continuously provide the insulating resin layer across the surface of the end part of the body to be transferred X on the one side, the side face of the end part thereof, and the surface of the end part thereof on the other side as shown in FIGS. 5 and 6.

2.1.1. Transfer Ring

The resin applicator 200 includes a pair of the transfer rings 110, 110 that are arranged so that the transfer surfaces 110*a*, 110*a* face each other via the clearance 110*b*. Each transfer ring 110 has a ringlike transfer surface 110*a*. The size of the transfer ring 110 is not specifically limited. For example, the diameter of the transfer ring 110 is preferably 50 mm to 200 mm and the width of the transfer surface 110*a* (thickness of a ring across the page of FIG. 5 between left and right) is preferably 3 mm to 20 mm from such a viewpoint that the insulating resin layer can be more easily formed for the extending part 40 of the all solid-state battery 100. Any material may be used for the transfer ring 110 as long as making it possible to suitably transfer the ultraviolet cure resin 121 to the body to be transferred X. The transfer ring 110 may be constituted of ceramics, metal, resin, or the like. The transfer ring 110 is preferably made from material that is transparent to ultraviolet rays in view of easy arrival of an ultraviolet ray from the ultraviolet light source 130 to the clearance 110b. Examples of material transparent to ultraviolet rays include clear ceramics such as quarts, and resins such as acrylic resins and PTFE. The transfer surface 110a is preferably made from polytetrafluoroethylene or silicon in view of improving releasability from the ultraviolet cure resin 121 (from the viewpoint that the resin is easy to be removed from the surface). That is, the surface of the transfer ring 110 is preferably treated with PTFE or silicon.

In the resin applicator 200, a pair of the transfer rings 110, 110 are arranged so that the transfer surfaces 110a, 110a face each other via the clearance 110b. The size of the clearance 110b is not specifically limited. The clearance 110b of 100 µm to 1 mm is preferable from such a viewpoint that the insulating resin layer can be more easily formed for the extending part 40 of the all solid-state battery 100.

A spacing mechanism for increasing and reducing the clearance 110b is preferably provided for the resin applicator 200. The spacing mechanism may increase and reduce the clearance 110b either automatically or manually. For example, when a pair of the transfer rings 110, 110 are arranged on the top and bottom respectively, an elevator for lifting up and down the position of at least one of a pair of the transfer rings 110, 110 can be employed for the spacing mechanism. When the resin is started to be transferred to the end part of the body to be transferred X, increasing the clearance 110b by means of the spacing mechanism makes it possible to smoothly arrange the end part of the body to be transferred X in the clearance 110b as suppressing breaking of and damage to the end part of the body to be transferred X.

In the resin applicator 200, a notch may be provided for at least one of the transfer rings 110, 110. If the transfer ring 110 having a notch as described above is used, the clearance 110b increases when the transfer ring 110 is rotated and a notched portion reaches the clearance 110b. That is, the end part of the body to be transferred X is arranged in the clearance 110b at the timing when the notched portion reaches the clearance 110b, which makes it possible to smoothly arrange the end part of the body to be transferred X in the clearance 110b as suppressing breaking of and damage to the end part of the body to be transferred X.

As shown in FIGS. 5 and 6, the transfer ring 110 is rotatable in a predetermined direction on a rotation axis that is the center of the ring. As shown in FIGS. 5 and 6, a pair of the transfer rings 110, 110 is controlled so as to rotate in the opposite direction respectively. A pair of the transfer rings 110, 110 is controlled so that their rotation speeds are approximately the same. Whereby, the ultraviolet cure resin 121 can be transferred across the surface of the end part of the body to be transferred X on the one side, the side face of the end part thereof, and the surface of the end part thereof on the other side at the same time. A power source for rotating the transfer ring 110 is not specifically limited. For example, as shown in FIG. 5, the transfer ring 110 can be rotated at a predetermined speed in a predetermined direction by a motor 140 and a controlling device (not shown).

2.1.2. Resin Supply

The resin applicator 200 includes at least one resin supply (supplies) 120, 120 that supplies an ultraviolet cure resin to the transfer surfaces 110a, 110a of the transfer rings 110,110. Each resin supply 120 is a device that supplies the ultraviolet cure resin 121 to the transfer surface 110a. The resin supply 120 has only to be able to supply a certain volume of the ultraviolet cure resin to the transfer surface 110a. Examples of such a device include a dispenser. When a dispenser is employed, a type thereof is not specifically limited, and any type such as a syringe, volume measuring, tubing, and non-contact may be employed. The ultraviolet cure resin 121 may be continuously supplied to the transfer surface 110a via an extruding nozzle or the like, and may be intermittently supplied in the form of droplets via a spray nozzle or the like. The volume of supplying the ultraviolet cure resin 121 from the resin supply 120 to the transfer surface 110a (flow rate and flow speed) is not specifically limited, and may be properly adjusted according to the form of the insulating resin layer to be formed over the end part of the body to be transferred etc.

The ultraviolet cure resin 121 is not specifically limited, and any popular ultraviolet cure resin may be employed. Examples thereof include ultraviolet cure resins of a cationic polymerization system and a radical polymerization system. The ultraviolet cure resin 121 may contain filler in view of preventing film from being cut in transfer to improve reliability of the thickness etc. A filler used here is not specifically limited, and a particle made from any material may be employed. While oxygen inhibits a curing reaction in some ultraviolet cure resins, the ultraviolet cure resin 121 can be properly cured in the clearance 110b by the ultraviolet ray from the ultraviolet light source 130 even if a resin whose curing reaction is inhibited by oxygen is employed for the ultraviolet cure resin 121 since oxygen is almost blocked in the clearance 110b of the resin applicator 200. In this point, in the resin applicator 200, it is not necessary that an atmosphere around the transfer ring 110 etc. be an inert atmosphere such as a nitrogen atmosphere when the resin 121 is transferred and cured, and the atmosphere may be even an oxygen-containing atmosphere such as the air atmosphere. As described later, it is also possible to precure only part of the ultraviolet cure resin 121 by effectively using inhibition of a curing reaction by oxygen.

The resin supply 120 has only to be arranged so as to be able to properly supply the ultraviolet cure resin 121 to the transfer surface 110a. For example, as shown in FIG. 6, the resin supply 120 can be arranged on the upstream side of the transfer ring 110 in the direction of conveying the body to be transferred X. Alternatively, the resin supply 120 can be arranged on the downstream side of the transfer ring 110 in the direction of conveying the body to be transferred X as well when precure of the ultraviolet cure resin 121 is desired to progress.

In the resin applicator 200, the number of the resin supplies 120 is not specifically limited. As shown in FIG. 6, one or more resin supplies 120 may be arranged for one transfer ring 110.

2.1.3. Ultraviolet Light Source

The resin applicator 200 includes at least one ultraviolet light source 130 that supplies an ultraviolet ray to at least the clearance 110b. The type of the ultraviolet light source 130 is not specifically limited, and any ultraviolet light source that emits ultraviolet light and/or ultraviolet ray which can cure the ultraviolet cure resin 121 such as an ultraviolet lamp and an ultraviolet light emitting diode can be employed. An ultraviolet light emitting diode is especially preferable from such a viewpoint that the direction of irradiation with an ultraviolet ray can be more easily controlled etc.

Figure 7:
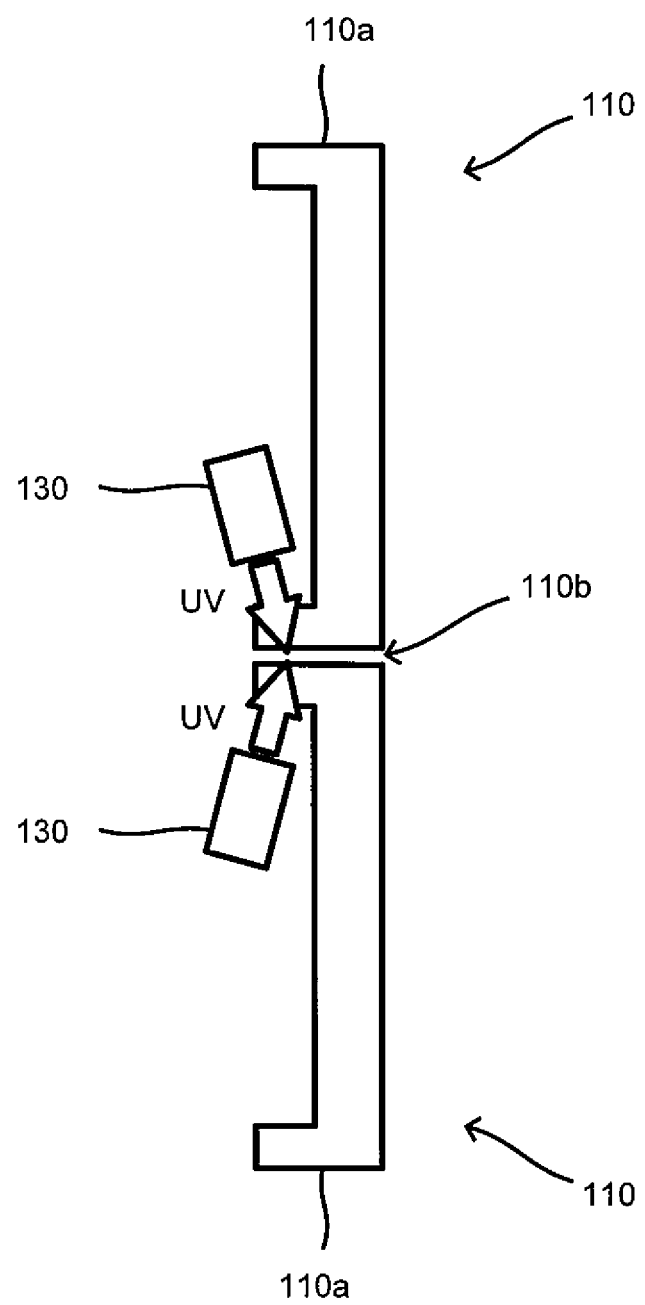
FIG. 7 is a schematic view of an example of arrangement of ultraviolet light sources 130 in the resin applicator 200: the body to be transferred X is conveyed into the page.

The position of the ultraviolet light source 130 in the resin applicator 200 is not specifically limited. For example, as shown in FIG. 5, the ultraviolet light source 130 can be arranged in the vicinity of the clearance 110b. The ultraviolet ray from the ultraviolet light source 130 may reach the clearance 110b after transmitting some member. For example, the resin applicator 200 may be configured so that the ultraviolet ray emitted from the ultraviolet light source 130 is transmitted through the transfer rings 110 to reach the clearance 110*b* as shown in FIG. 7 when the transfer ring 110 is transparent to ultraviolet rays. Irradiation with the ultraviolet ray through the transfer ring 110 makes it possible to further efficiently cure the ultraviolet cure resin 121 in the clearance 110*b*. Alternatively, the ultraviolet ray from the ultraviolet light source 130 may reach the clearance 110*b* after reflected by a reflector as described later.

Figure 8:
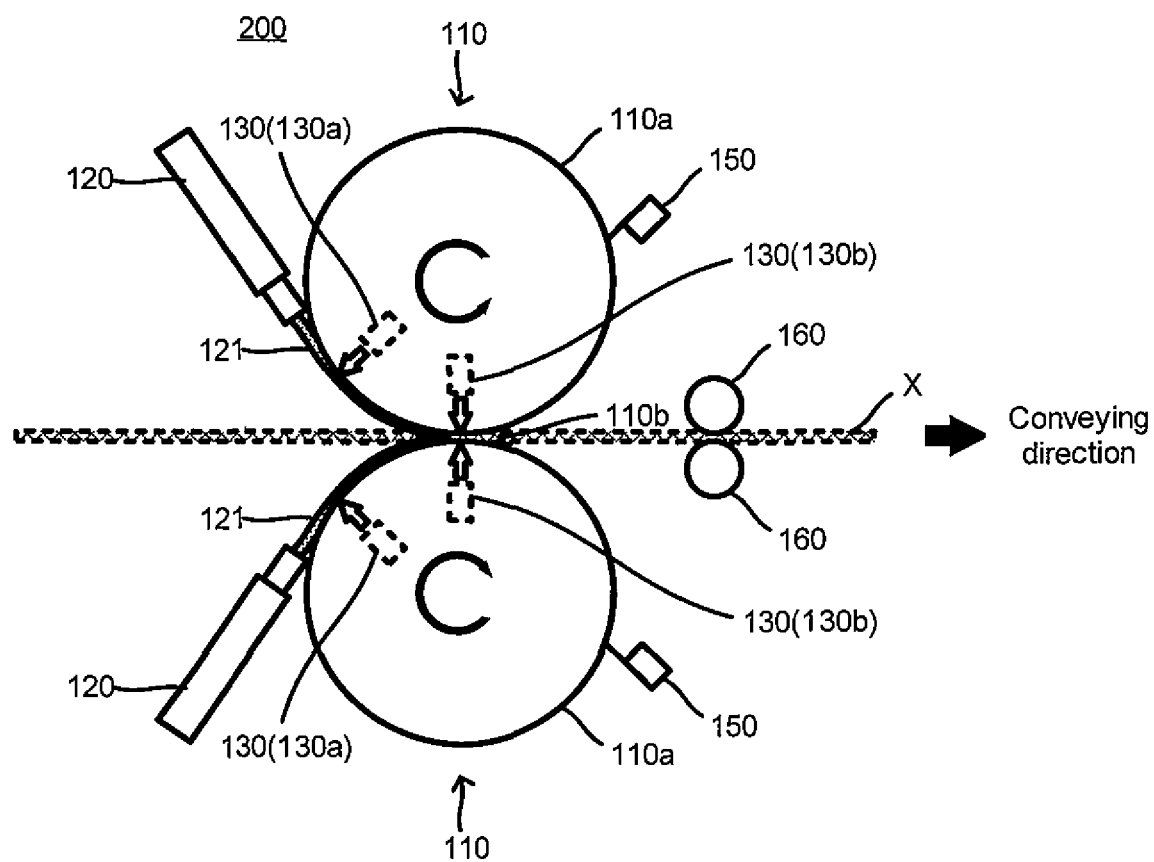
FIG. 8 is a schematic view of another example of arrangement of the ultraviolet light sources 130 in the resin applicator 200: the body to be transferred X is conveyed across the page from left to right.
Figure 9:
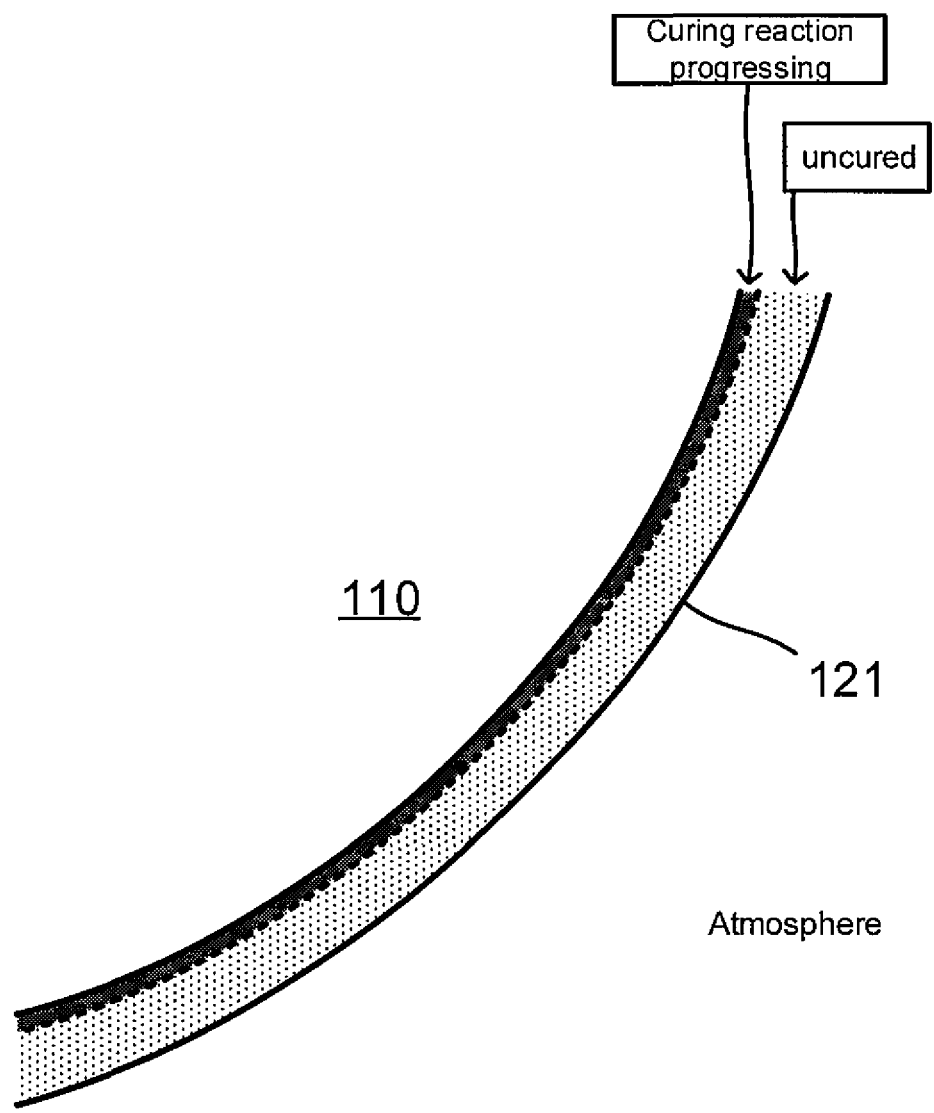
FIG. 9 is a schematic view illustrating precuring of an ultraviolet cure resin 121 over a transfer surface 110a of a transfer ring 110.

The number of the ultraviolet light sources 130 is not limited to one, and a plurality of the ultraviolet light sources 130 may be included in the resin applicator 200. If the resin applicator 200 includes a plurality of the ultraviolet light sources 130, 130 . . . , at least a part of a plurality of the ultraviolet light sources 130, 130 . . . necessarily supplies ultraviolet rays to the clearance 110*b*, and an ultraviolet light source 130 that supplies the ultraviolet ray to a portion of the transfer surface 110*a* which does not face the clearance 110*b* may exist as described later. For example, if including a plurality of the ultraviolet light sources 130, the resin applicator 200 may be configured so that an ultraviolet ray emitted from a part of the ultraviolet light sources 130 (130*a*) is transmitted through the transfer rings 110, to reach portions of the transfer surfaces 110*a*, the portions not facing the clearance 110*b*, and the ultraviolet cure resin 121 that is supplied from the resin supply 120 to the transfer surfaces 110*a* is precured by the ultraviolet ray from the part of the ultraviolet light sources 130 (130*a*) on the transfer surfaces 110*a* before the ultraviolet ray reaches the clearance 110*b* as shown in FIG. 8. In this case, a wavelength of the ultraviolet ray emitted from the part of the ultraviolet light sources 130 (130*a*) may be different from a wavelength of an ultraviolet ray emitted from the rest of the ultraviolet light sources 130 (130*b*). Also in this case, the ultraviolet cure resin 121 may be material that is cured by being irradiated with ultraviolet light having at least 2 wavelengths. For example, the ultraviolet cure resin 121 may contain at least two or more polymerization initiators. In this case, the ultraviolet rays emitted from a part of the ultraviolet light sources 130 (130*a*) (for example, ultraviolet rays having a long wavelength) make it easy to precure the ultraviolet cure resin 121 on the transfer surface 110*a* before reaching the clearance 110*b* and thereafter, ultraviolet rays emitted from other ultraviolet light sources 130 (130*b*) (for example, ultraviolet rays having a short wavelength) make it easy to completely cure the ultraviolet cure resin 121 in the clearance 110*b*. A plurality of the ultraviolet light sources 130 may be provided on the concentric circle of the transfer ring 110 (for example, see FIG. 11B). When a reflector described later is provided, a plurality of the ultraviolet light sources 130 may be positioned according to the shape of the reflector. As described above, precuring the ultraviolet cure resin 121 over the transfer surface 110*a* before the ultraviolet cure resin 121 reaches the clearance 110*b* makes it expectable to improve the curing speed of the ultraviolet cure resin 121 in the clearance 110*b* to improve reliability of resin coating. A degree of precuring the ultraviolet cure resin 121 is not specifically restricted as long as transferring properties and adhesiveness to the body to be transferred X are ensured. If a resin whose curing reaction is inhibited by oxygen is used as the ultraviolet cure resin 121, a curing reaction progresses on a face of the ultraviolet cure resin 121 supplied to the transfer surface 110*a* which is not exposed to the atmosphere (face coming into contact with the transfer surface 110*a*, interface with the transfer surface 110*a*) while not progressing on a face thereof which is exposed to the atmosphere (face to come into contact with and be adhered to the surface of the end part of the body to be transferred X) in precuring as shown in FIG. 9. That is, high transferring properties and adhesiveness to the body to be transferred X can be ensured even when the ultraviolet cure resin 121 is precured.

2.1.4. Other Members

The resin applicator 200 has only to include a pair of the transfer rings 110, 110, at least one resin supply 120, and at least one ultraviolet light source 130. Members other than them are optional.

For example, as shown in FIG. 6, the resin applicator 200 may include scrapers 150 for removing resin remaining on the transfer surfaces 110*a*, on the downstream side of the transfer rings 110 in the direction of conveying the body to be transferred X. The resin applicator 200 may include rollers 160 for assisting the body to be transferred X in release from the transfer surfaces 110, on the downstream side of the transfer rings 110 as shown in FIG. 6.

2.2. Resin Applicator 300

Figure 10:
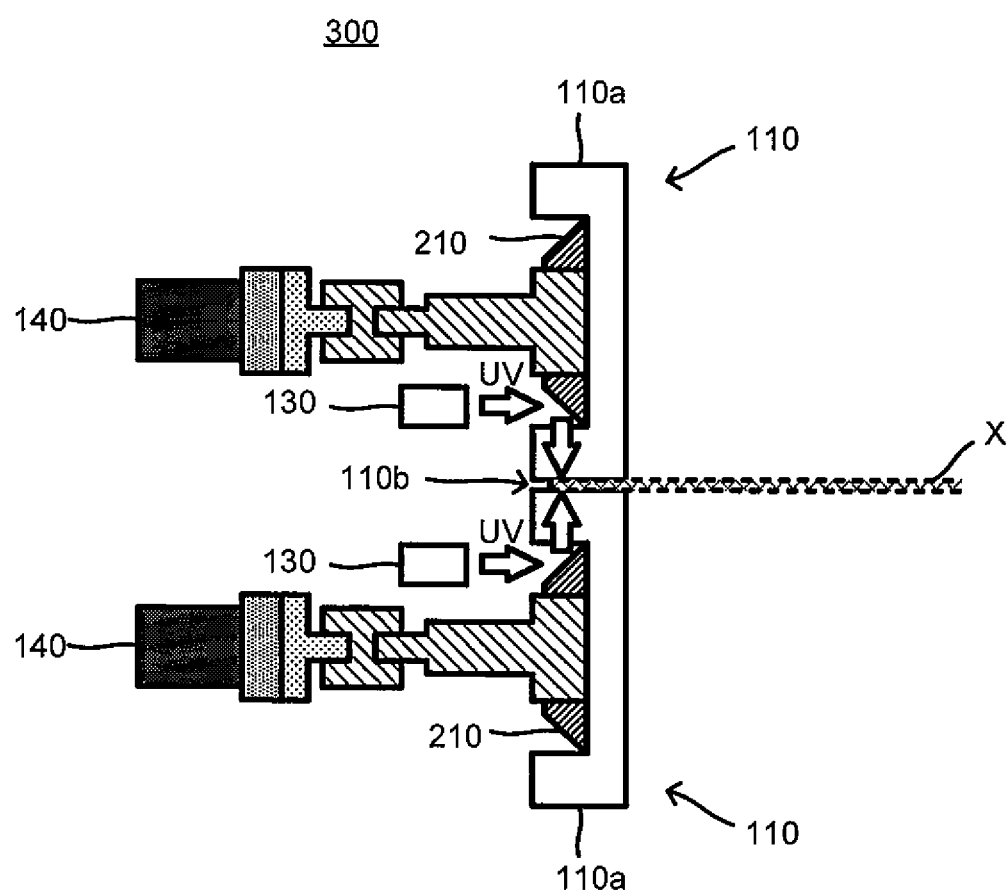
FIG. 10 is a schematic view of structure of a resin applicator 300: the body to be transferred X is conveyed into the page.

FIG. 10 schematically shows structure of a resin applicator 300 that is application of the resin applicator 200. In FIG. 10, reference numerals same as the resin applicator 200 are added to components same as the resin applicator 200. As shown in FIG. 10, in the resin applicator 300, the transfer rings 110 are transparent to an ultraviolet ray, and the resin applicator 300 includes reflectors 210 inside the transfer surfaces 110*a* respectively, the reflectors 210 reflecting the ultraviolet ray from the ultraviolet light source 130, and is configured so that the ultraviolet ray emitted from the ultraviolet light source 130 is reflected by the reflectors 210, and is transmitted through the transfer rings 110 to reach the clearance 110*b*. Using the reflector 210 to control the travelling direction of the ultraviolet ray as described above increases the flexibility of disposition of the ultraviolet light source 130, and makes it possible to downsize the applicator etc.

Figure 11A:
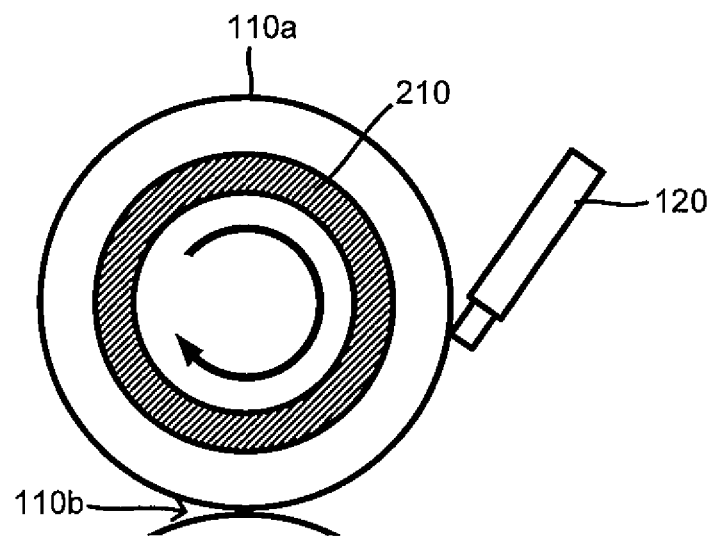
FIGS. 11A and 11B are schematic views illustrating arrangement of a reflector and ultraviolet light sources in the resin applicator 300: the body to be transferred X is conveyed across the page from right to left.
Figure 11B:
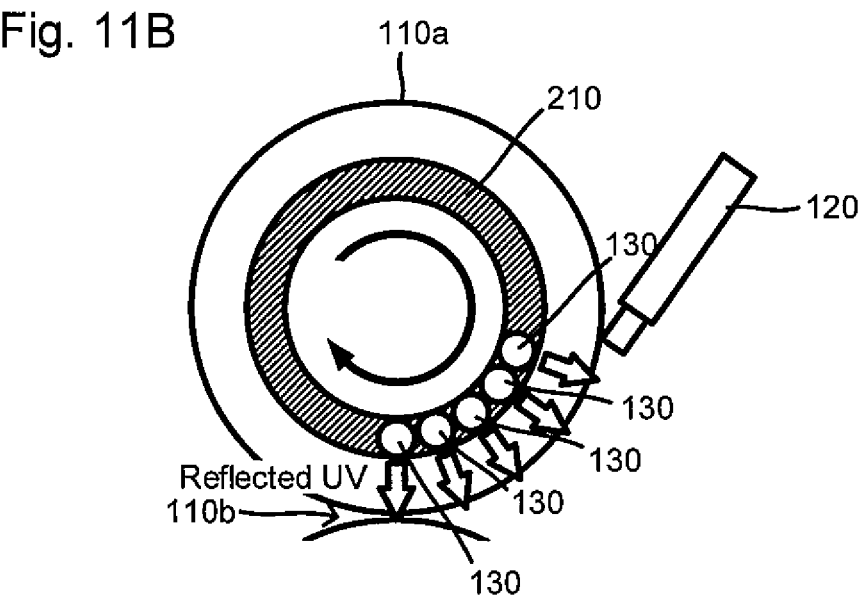

The reflector 210 may be composed separately from the transfer ring 110, and may be fixed to the transfer ring 110. The reflector 210 is preferably fixed to the transfer ring 110 in view of handleability, easiness of arrangement, etc. The shape of the reflector 210 is not specifically restricted. Preferably, the reflectors 210 are continuously provided on concentric circles of the transfer rings 110 inside the transfer surfaces 110*a* respectively as shown in FIG. 11A. Whereby, a plurality of the ultraviolet light sources 130 can be arranged circumferentially along the shape of the reflector 210 as shown in FIG. 11B, which makes it easy to precure the ultraviolet cure resin 121.

The reflection angle of the ultraviolet ray by the reflector 210 is not specifically restricted, and may be properly determined in view of the direction of emitting the ultraviolet ray from the ultraviolet light source 130, and the position of the clearance 110*b*. Specifically, the ultraviolet ray from the ultraviolet light source 130 is preferably reflected by the reflector 210 at an approximately right angle as shown in FIG. 10, which makes it easier to arrange a plurality of the ultraviolet light sources 130 circumferentially along the shape of the reflector 210 as shown in FIG. 11B.

2.3. Resin Applicator 400

Figure 12:
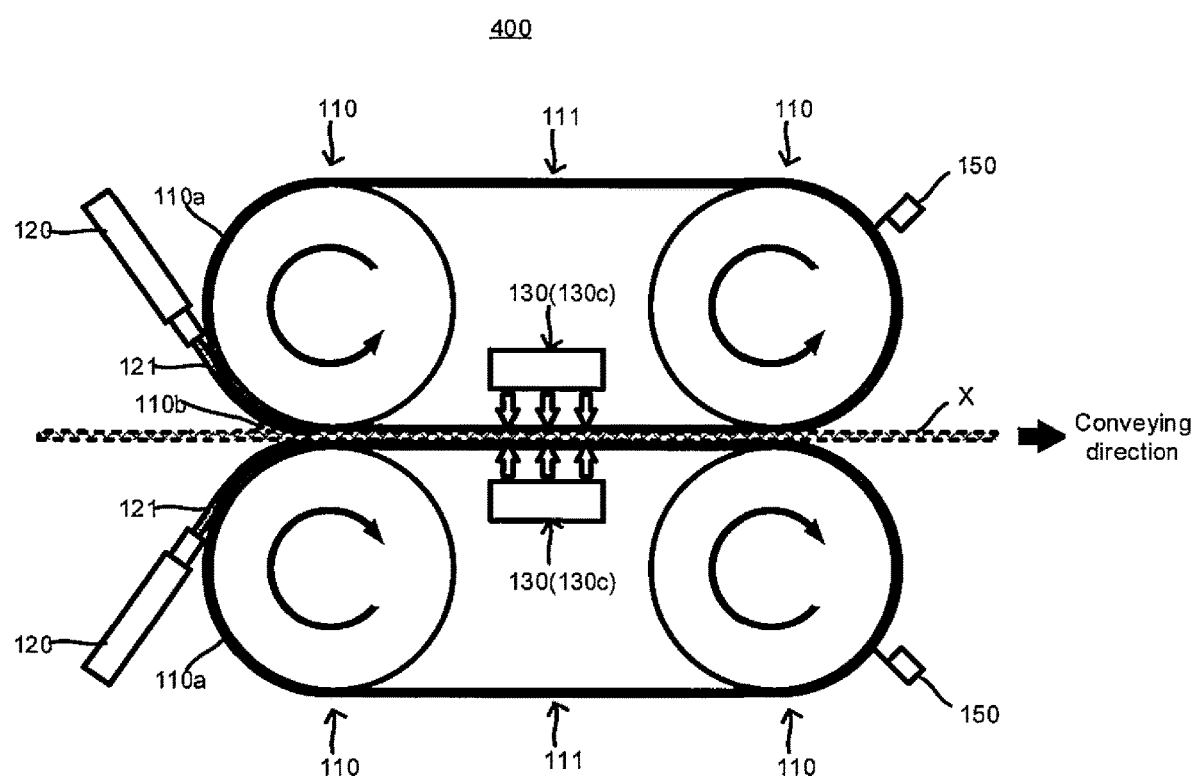
FIG. 12 is a schematic view of structure of a resin applicator 400: the body to be transferred X is conveyed across the page from left to right.

FIG. 12 schematically shows structure of a resin applicator 400 that is application of the resin applicator 200. In FIG. 12, reference numerals same as the resin applicator 200 are added to components same as the resin applicator 200. As shown in FIG. 12, in the resin applicator 400, the transfer rings 110 have conveyor belts 111 respectively on surfaces thereof, and surfaces of the conveyor belts 111 are the transfer surfaces 110*a*. In this case, preferably, a plurality of transfer rings 110, 110 are provided in the direction of conveying the body to be transferred X, to be linked to each other via a conveyor belt 111 as shown in FIG. 12. Providing the conveyor belt 111 for a surface of the transfer ring 110 as described above, makes it possible to more smoothly convey the body to be transferred X. Here, one feature of the resin applicator 400 is that material of the surfaces of the conveyor belts 111 is superior in releasability from the ultraviolet cure resin to material of the surface of the end part of the body to be transferred X. Examples of such a material superior in releasability include fluororesins. Specific example of fluororesins includes polytetrafluoroethylene. At least the surface of the conveyor belt 111 is necessarily made from a material superior in this releasability. Examples of an employed embodiment thereof include an embodiment of making the whole of the belt from such a material and an embodiment of coating the surface of the belt with such a material. This makes the ultraviolet cure resin 121 after cured easy to be released from the transfer surface 110a, makes it possible to further smoothly convey the body to be transferred X and further improves reliability of resin coating over the end part of the body to be transferred X.

As shown in FIG. 12, when a plurality of the transfer rings 110, 110, which are provided in the conveying direction, are linked to each other via the conveyor belt 111, the length (distance between the transfer rings 110, 110 in the conveying direction) and conveying rate of the conveyor belt 111 may be properly adjusted according to curing time of the ultraviolet cure resin 121 etc. As shown in FIG. 12, the ultraviolet light source 130 (130c) may be provided between a plurality of the transfer rings 110, 110, which are provided in the conveying direction. In this case, a range of irradiation with the ultraviolet ray from the ultraviolet light source 130 (130c) may be properly determined according to the length and conveying rate of the conveyor belt 111 and the curing time of the ultraviolet cure resin 121 etc. Providing the ultraviolet light source 130 (130c) between a plurality of the transfer rings 110, 110, which are provided in the conveying direction, when a plurality of the transfer rings 110, 110, which are provided in the conveying direction, are linked to each other via the conveyor belt 111 makes it possible to more surely cure the ultraviolet cure resin 121.

2.4. Effect

As described above, according to the resin applicators 200, 300, 400, etc. the ultraviolet cure resin can be transferred to the faces of the end part of the body to be transferred X on the one and the other side, and the side face of the end part thereof at the same time using a pair of the transfer rings 110, 110. Whereby, the ultraviolet cure resin 121 can be thinly transferred as compressed over the end part of the body to be transferred X without damaging the body to be transferred X while restoring camber and waviness of the body to be transferred. In addition, a precise amount of the insulating resin layer can be provided for an exact portion of the end part of the body to be transferred as damage due to the contact between a nozzle and the body to be transferred X is avoided.

3. Resin Application System

The art of the present disclosure also has an aspect of a resin application system. That is, as shown in FIGS. 5 to 12, a resin application system of the present disclosure includes a pair of the transfer rings 110, 110 that are arranged so that the transfer surfaces 110a, 110a face each other via the clearance 110b; at least one resin supply 120 that supplies the ultraviolet cure resin 121 to the transfer surfaces 110a, 110a of the transfer rings 110, 110; and at least one ultraviolet light source 130 that supplies an ultraviolet ray to at least the clearance 110b; and the body to be transferred X, over the end part of which the ultraviolet cure resin 121 is transferred and the insulating resin layer is formed. In the resin application system, the end part of the body to be transferred X is arranged in the clearance 110b; the ultraviolet cure resin 121 that is supplied from the resin supply 120 to the transfer surfaces 110a, 110a of the transfer rings 110, 110 is transferred from the transfer surfaces 110a, 110a across the surface of the end part of the body to be transferred X on the one side, the side face of the end part thereof, and the surface of the end part thereof on the other side at the same time as the transfer rings 110, 110 rotate; and the transferred ultraviolet cure resin 121 is cured by the ultraviolet ray from the ultraviolet light source 130, to continuously provide the insulating resin layer across the surface of the end part of the body to be transferred X on the one side, the side face of the end part thereof, and the surface of the end part thereof on the other side. In the resin application system of the present disclosure, forms that may be employed for the transfer ring 110, the resin supply 120 and the ultraviolet light source 130 correspond to those in the resin applicators 200, 300 and 400, and thus detailed descriptions thereof are omitted here. In the resin application system of the present disclosure, examples of a form that may be employed for the body to be transferred X include the all solid-state battery 100. That is, according to the resin application system of the present disclosure, when the all solid-state battery 100 is produced, the insulating resin layer 50 can be continuously provided across the surface of the extending part 40 on the one side, a side face thereof, and the surface thereof on the other side.

4. Method for Producing All Solid-State Battery

Figure 13A:
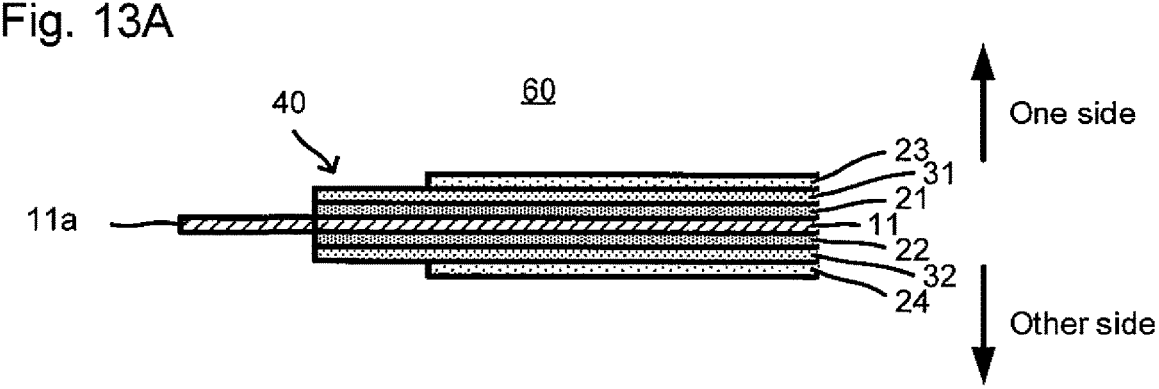
FIGS. 13A to 13D are schematic views illustrating an example of a method for producing the all solid-state battery 100.

The art of the present disclosure also has an aspect of a method for producing the all solid-state battery 100. As shown in FIGS. 13A to 13D, in the method for producing the all solid-state battery 100 of the present disclosure, the first active material layer 21 is layered onto the surface of the first current collector layer 11 on the one side; the second active material layer 22 is layered onto the surface of the first current collector layer 21 on the other side; the first solid electrolyte layer 31 is layered onto the surface of the first active material layer 21 on the one side; the second solid electrolyte layer 32 is layered onto the surface of the second active material layer 22 on the other side; the third active material layer 23 is layered onto the surface of the first solid electrolyte layer 31 on the one side; and the fourth active material layer 24 is layered onto the surface of the second solid electrolyte layer 32 on the other side (FIG. 13A). Here, both the first and second active material layers 21 and 22 are made to be anode active material layers or cathode active material layers, and in a case where both the first and second active material layers 21 and 22 are anode active material layers, both the third and fourth active material layers 23 and 24 are made to be cathode active material layers and in a case where both the first and second active material layers 21 and 22 are cathode active material layers, both the third and fourth active material layers 23 and 24 are made to be anode active material layers, and at least the first and second active material layers 21 and 22 are extended to an outer side than the third and fourth active material layers 23 and 24, to constitute the extending part 40 (FIG. 13A). After the extending part 40 is composed as described above, the ultraviolet cure resin 121 is continuously provided across the surface of the extending part 40 on the one side, the side face of the extending part 40, and the surface of the extending part 40 on the other side by transfer (FIG. 13B), and the ultraviolet cure resin 121, which is transferred to the extending part 40, is irradiated with an ultraviolet ray, and cured to form the insulating resin layer 50 (FIG. 13C). The second current collector layer 12 is layered onto the surface of the third active material layer 23 on the one side and the third current collector layer 13 is layered onto the surface of the fourth active material layer 24 on the other side after the insulating resin layer 50 is provided for the extending part 40 (FIG. 13D).

4.1. Making Body to be Transferred (Laminate 60)

In the producing method of the present disclosure, as shown in FIG. 13A, the layers 11, 21 to 24, 31 and 32 are layered to have the third active material layer 23, the first solid electrolyte layer 31, the first active material layer 21, the first current collector layer 11, the second active material layer 22, the second solid electrolyte layer 32 and the fourth active material layer 24 as the order mentioned, and to obtain a laminate 60 having the extending part 40. Here, the order of layering the layers 11, 21 to 24, 31 and 32 are not specifically limited. When the current collector tab 11a is provided for the first current collector layer 11, it is better to connect the current collector tab 11a to the first current collector layer 11 before the ultraviolet cure resin is transferred. One may protrude part of the first current collector layer 11 by, for example, partially cutting metal foil, and make this part the current collector tab 11a.

4.2. Transferring Ultraviolet Cure Resin to End Part of Body to be Transferred (Extending Part 40)

Figure 13B:
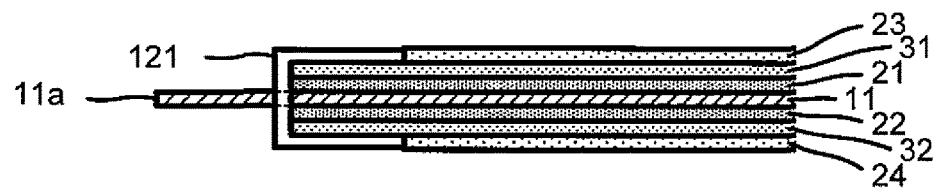
Figure 13C:
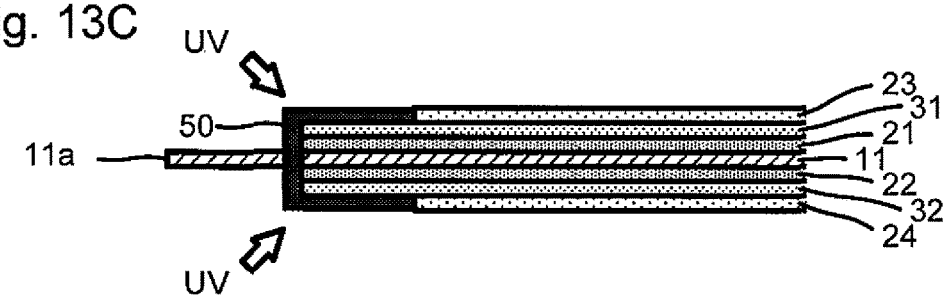
Figure 13D:
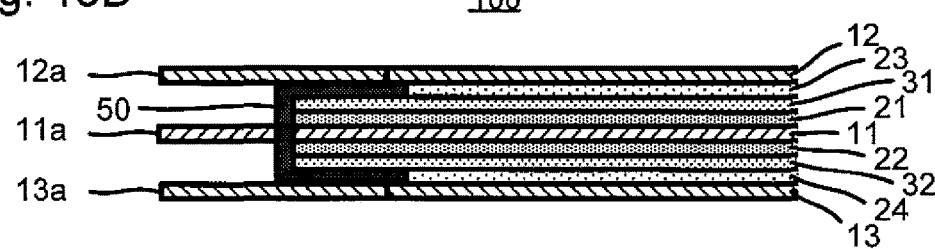

In the producing method of the present disclosure, after the laminate 60 is obtained, the ultraviolet cure resin 121 is continuously provided across the surface of the extending part 40 on the one side, the side face of the extending part 40, and the surface of the extending part 40 on the other side by transfer as shown in FIG. 13B. For example, as the resin applicators 200 and 300, the ultraviolet cure resin 121 is transferred to both faces of the extending part 40 from the one and the other sides at the same time using a pair of the transfer rings 110, 110.

4.3. Curing Ultraviolet Cure Resin

In the producing method of the present disclosure, after the ultraviolet cure resin is transferred to the extending part 40, the ultraviolet cure resin transferred to the extending part 40 is irradiated with an ultraviolet ray, and the ultraviolet cure resin is cured to be the insulating resin layer 50 as shown in FIG. 13C. For example, as the resin applicators 200 and 300, the ultraviolet cure resin 121 is cured by the ultraviolet ray from the ultraviolet light source 130 in the clearance 110b between a pair of the transfer rings 110, 110.

4.4. Layering Second and Third Current Collector Layers

In the producing method of the present disclosure, after the insulating resin layer 50 is provided for the extending part 40, the second current collector layer 12 is layered onto the surface of the third active material layer 23 on the one side, and the third current collector layer 13 is layered onto the surface of the fourth active material layer 24 on the other side as shown in FIG. 13D, whereby the all solid-state battery 100 can be obtained. The obtained all solid-state battery 100 may be stored in a battery case properly.

4.5. Effect

As described above, according to the method for producing the all solid-state battery 100 of the present disclosure, a precise amount of the insulating resin layer 50 can be provided for an exact portion of the extending part 40 by transferring the ultraviolet cure resin 121 to the surfaces of the extending part 40 of the all solid-state battery 100 on the one and the other sides and the side face thereof, as damage to the extending part 40 can be avoided. Short circuits and sliding down at the end part of the battery can be suppressed by providing the second current collector layer 12 and the third current collector layer 13 after providing the insulating resin layer 50 for the extending part 40 (see FIGS. 4A and 4B).

INDUSTRIAL APPLICABILITY

The all solid-state battery of this disclosure can be preferably used as a power source in a wide range such as a small-sized power source for portable devices and an onboard large-sized power source.

REFERENCE SIGNS LIST

11 first current collector layer
11a first current collector tab
12 second current collector layer
12a second current collector tab
13 third current collector layer
13a third current collector tab
21 first active material layer
22 second active material layer
23 third active material layer
24 fourth active material layer
31 first solid electrolyte layer
32 second solid electrolyte layer
40 extending part
50 insulating resin layer
100 all solid-state battery
110 transfer ring
110a transfer surface
110b clearance
111 conveyor belt
120 resin supply
130 ultraviolet light source
200 resin applicator
210 reflector
300 resin applicator
400 resin applicator

What is claimed is:

1. An all solid-state battery comprising:
a first current collector layer;
a first active material layer that is layered onto a surface of the first current collector layer on one side;
a second active material layer that is layered onto a surface of the first current collector layer on another side;
a first solid electrolyte layer that is layered onto a surface of the first active material layer on the one side;
a second solid electrolyte layer that is layered onto a surface of the second active material layer on the other side;
a third active material layer that is layered onto a surface of the first solid electrolyte layer on the one side;
a fourth active material layer that is layered onto a surface of the second solid electrolyte layer on the other side;
a second current collector layer that is layered onto a surface of the third active material layer on the one side; and
a third current collector layer that is layered onto a surface of the fourth active material layer on the other side,
wherein both the first and second active material layers are anode active material layers or cathode active material layers, and in a case where both the first and second active material layers are anode active material layers, both the third and fourth active material layers are cathode active material layers and in a case where both the first and second active material layers are cathode active material layers, both the third and fourth active material layers are anode active material layers,
at least the first current collector layer extends farther to an outer side than the third and fourth active material layers, to constitute an extending part,
an insulating resin layer is continuously provided across a surface of the extending part on the one side, a side face of the extending part, and a surface of the extending part on the other side, and
the insulating resin layer is provided for side faces of the first active material layer, the second active material layer, the first solid electrolyte layer and the second solid electrolyte layer, and the insulating resin layer has a cross section that is substantially C-shaped.

2. The all solid-state battery according to claim 1, wherein
a surface of the insulating resin layer on the one side is present closer to the other side than the surface of the third active material layer on the one side is, and
a surface of the insulating resin layer on the other side is present closer to the one side than the surface of the fourth active material layer on the other side is.

3. The all solid-state battery according to claim 1, wherein the insulating resin layer is present between the second and third current collector layers.

4. The all solid-state battery according to claim 1, wherein at least the first current collector layer, the first active material layer and the second active material layer extend farther to an outer side than the third and fourth active material layers, to constitute the extending part.

5. The all solid-state battery according to claim 1, wherein the first current collector layer, the first active material layer, the second active material layer, the first solid electrolyte layer and the second solid electrolyte layer extend farther to an outer side than the third and fourth active material layers, to constitute the extending part.

6. The all solid-state battery according to claim 5, wherein the insulating resin layer is continuously provided across the surface of the first solid electrolyte layer on the one side, the side face of the extending part, and the surface of the second solid electrolyte layer on the other side.

7. A method for producing the all solid-state battery of claim 1, the method comprising:
layering a first active material layer onto a surface of a first current collector layer on one side;
layering a second active material layer onto a surface of the first current collector layer on another side;
layering a first solid electrolyte layer onto a surface of the first active material layer on the one side;
layering a second solid electrolyte layer onto a surface of the second active material layer on the other side;
layering a third active material layer onto a surface of the first solid electrolyte layer on the one side;
layering a fourth active material layer onto a surface of the second solid electrolyte layer on the other side;
making both the first and second active material layers anode active material layers or cathode active material layers, and in a case where both the first and second active material layers are anode active material layers, making both the third and fourth active material layers cathode active material layers and in a case where both the first and second active material layers are cathode active material layers, making both the third and fourth active material layers anode active material layers;
extending at least the first and second active material layers farther to an outer side than the third and fourth active material layers, to constitute an extending part;
continuously providing ultraviolet cure resin across a surface of the extending part on the one side, a side face of the extending part, and a surface of the extending part on the other side by transfer;
irradiating the ultraviolet cure resin, which is transferred to the extending part, with an ultraviolet ray, and curing the ultraviolet cure resin to form an insulating resin layer; and
layering a second current collector layer onto a surface of the third active material layer on the one side and layering a third current collector layer onto a surface of the fourth active material layer on the other side after providing the insulating resin layer for the extending part.

* * * * *